Sept. 20, 1938. R. E. NEWELL Re. 20,864

COMBINATION GAS COCK FOR THERMOSTATS

Original Filed May 20, 1932 3 Sheets-Sheet 1

INVENTOR
Robert E. Newell,
By Byrne, Linn, Parmelee & Bleuler,
his attys.

Sept. 20, 1938. R. E. NEWELL Re. 20,864

COMBINATION GAS COCK FOR THERMOSTATS

Original Filed May 20, 1932 3 Sheets-Sheet 2

INVENTOR

Robert C. Newell by Lynn, Stillwell, Parmelee & Blenko his atty.

Sept. 20, 1938. R. E. NEWELL Re. 20,864

COMBINATION GAS COCK FOR THERMOSTATS

Original Filed May 20, 1932 3 Sheets-Sheet 3

INVENTOR
Robert E. Newell,
by Byrne, Sterling, Parmelee & Bleuler
his attys.

Reissued Sept. 20, 1938

Re. 20,864

UNITED STATES PATENT OFFICE 20,864

COMBINATION GAS COCK FOR THERMOSTATS

Robert E. Newell, Irwin, Pa., assignor to Robertshaw Thermostat Company, Youngwood, Pa., a corporation of Pennsylvania Original No. 1,994,831, dated March 19, 1935, Serial No. 612,625, May 20, 1932. Application for reissue March 11, 1937, Serial No. 130,330

9 Claims. (Cl. 236—15)

The present invention relates broadly to the art of fluid distribution, and more particularly to a control unit of compact and convenient construction consisting of a thermostat for temperature control of a domestic gas range oven, for example, and a shut off gas cock for the supply of gas through said thermostat to the oven.

Stove manufacturers during the last few years have been concerned in the production of gas ranges not only with the efficiency, but with the pleasing appearance thereof. As one feature leading to a more pleasing appearance, considerable attention has been paid to the construction of the front panel of the range, efforts being made to not only produce a front panel which is as compact as possible, but on which the different controls are grouped in a pleasing and attractive manner.

With gas ranges not embodying automatic temperature control devices, it has been possible to design the panels purely from the standpoint of utility and attractiveness. Where thermostatic controls have been provided, however, a complication has been experienced. If the control dial for the thermostat has been made small enough to permit of its having been placed at one end of the control panel, its proximity to the manual control for the oven has presented an unbalanced and crowded appearance.

In order to obviate this, it has been customary to place the oven cock at the opposite end of the panel and pipe across the burner chamber to the oven. This is not only more expensive, but it is inconvenient and confusing to the person using the controls, it being necessary to turn the thermostat at one end of the panel to the proper temperature setting and then to reach to the opposite end of the panel in order to open the oven cock.

The present invention has for one of its objects the provision of a compact and convenient control unit of such pleasing design as to permit of its being placed on a control panel in such manner as to provide a temperature control setting and oven cock control handle in closely adjacent readily accessible position. This permits removing the oven gas cock from its former improper grouping with the burner cocks and make it conveniently adjacent to, and appear as a part of, a thermostatic control unit which is obviously connected with the oven, this being accomplished without sacrificing the complete independent operation of the cock and thermostat.

While, on initial consideration, it might seem desirable to combine the movement of the oven cock and thermostat dial, such an arrangement is open to certain objections. In the first place, in order to set the thermostat dial accurately to a given marking, it is essential that the dial turn easily and smoothly so that the lady of the house, for instance, with her thumb and finger can quickly set the valve to the temperature desired without the use of any undue force. Gas cocks, when really gas-tight, are often hard to turn, and after being subjected to heat or wear, frequently become "jerky" in their operation. This is especially true of the larger barrel cocks usually considered necessary for oven gas capacity. Thus, if the thermostat dial is set by means of and simultaneously with the gas cock stem, a quick, accurate and easy adjustment of the thermostat dial is at least difficult and annoying.

In the second place, when using an independent gas cock for the control of the gas to the oven, the user can be certain that when he turns it even approximately to the off position, the gas is really shut off. He can ascertain this fact from a distance by the position of the handle without any close inspection of the dial markings and the like.

In the third place, it has been found in practice that in order to combine the gas cock and thermostat on a common stem, the barrel of the gas cock has to be at least twice the usual diameter, thus increasing friction and the force necessary to turn it, this of course being in addition to the force necessary to turn the thermostat itself. It is also true, that in spite of this increased diameter there is not sufficient sealing surface between the ports when the valve is closed to insure perfect tightness under high pressure gas such as propane and the like.

From the foregoing comments, the advantages of a compact grouping while retaining the possibility of individual operation, will be apparent.

In the accompanying drawings, I have shown more or less diagrammatically, for purposes of illustration only, certain preferred embodiments of the present invention. In the drawings.

Figure 1:
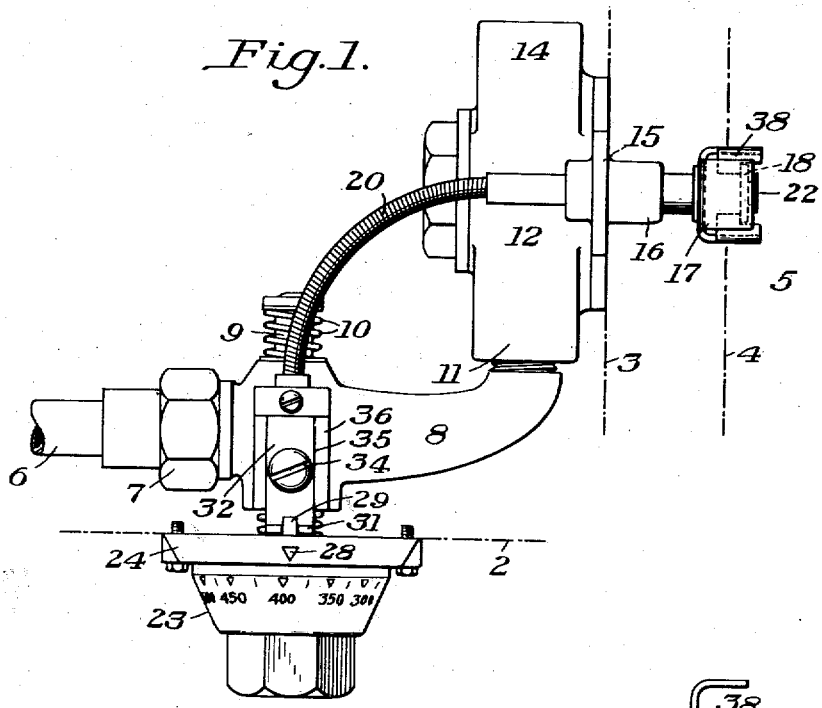
Figure 1 is a top plan view of a control unit constructed in accordance with the present invention.

Having reference more particularly to Figure 1 of the drawings, I have indicated by a broken line 2 the front panel or control panel of a gas range and by a broken line 3, the outside of an oven wall partly enclosing the oven space the temperature of which is to be controlled. The broken line 4 indicates approximately the position of the inside oven liner defining one side of the oven space 5.

Extending longitudinally of the front panel, and in back of the same, is a burner manifold 6 one end of which communicates through a suitable coupling 7 with a combination gas cock and thermostat mounting 8. The casing 8 is shaped to receive a barrel cock of usual construction, preferably tapered, one end 9 of which is projected to receive a spring 10 as customary in the art for the purpose of maintaining the desired leak-proof engagement between the barrel and its seat.

The opposite end of the casing 8 communicates with the inlet 11 of a thermostatic valve 12 the outlet 14 of which leads to a suitable oven burner, not shown. The valve 12 may be of such contour as to provide openings 15 for fastening means enabling the valve to be secured to the outside of the oven wall 3.

Extending through the oven wall are combined spacing and supporting means 16 preferably of relatively low heat conducting material adapted to support a housing 17 for a bi-metal element 18 as claimed more particularly in my co-pending application Serial No. 616,791, filed June 13, 1932, now Patent No. 1,970,969. As pointed out in said application, the housing 17 is preferably of relatively low heat conducting material such as chromium steel or the like having a polished surface disposed toward the bi-metal element, the construction being such that the housing and element are located substantially in the plane of the inside oven liner 4.

Projecting outwardly through one of the spacing means 16 is a flexible cable 20 connected at one end with a screw 21 extending through the element 18 and provided with an enlarged head 22 bearing against the face of the element 18 remote from the housing 17. The opposite end of the cable 20 is connected in any desired manner to a dial 23 located in front of the front panel 2. Mounted on the front panel 2 is a panel plate 24 having an opening 25 for the dial and formed with diametrically opposite openings 26 for the reception of fastening means for holding the panel plate in position.

Figure 7:
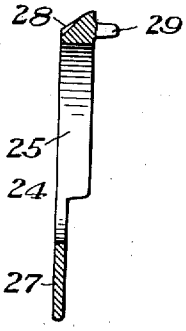
Figure 7 is a vertical sectional view on the line VII—VII of Figure 6.

By reference more particularly to Figure 7 of the drawings, it will be noted that the panel plate 24 at its upper portion is relatively thicker than at its lower portion 27, the extra thickness of the upper portion being so disposed that the lower portion 27 will lie substantially parallel to the front panel 2 but in spaced relation thereto. The thickened upper portion of the panel plate is also provided with a depression 28 constituting a pointer for cooperation with the dial 23.

Figure 3:
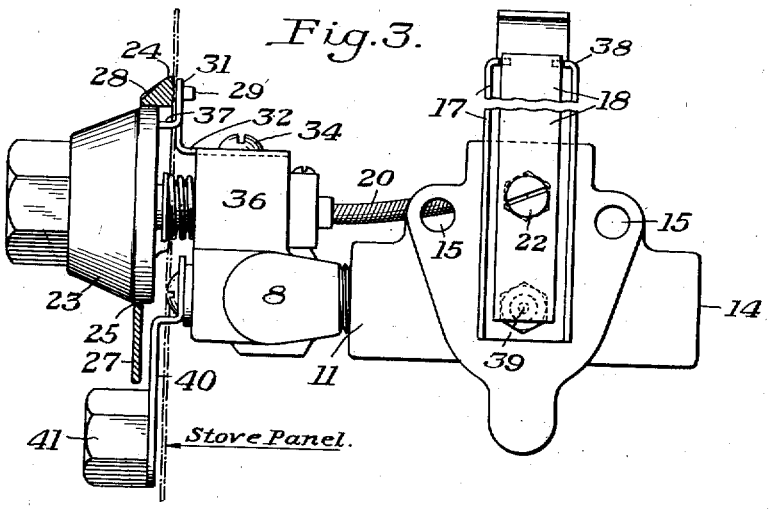
Figure 3 is a side elevational view of the construction shown in Figures 1 and 2.
Figure 4:
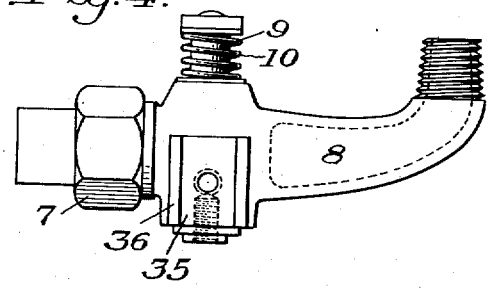
Figure 4 is a top plan view similar to Figure 1, of the gas cock alone.
Figure 5:
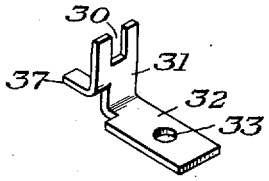
Figure 5 is a perspective view of the stop clip for the combination dial and gas cock.
Figure 6:
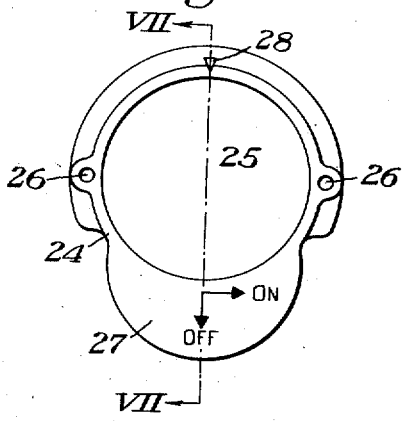
Figure 6 is a front elevational view of the panel plate for the combination dial and gas cock.

Extending rearwardly from the panel plate is a projection 29 adapted to pass through an opening in the front panel 2. This projection is adapted to extend into a slot 30 in the upstanding portion 31 of a stop clip as shown more particularly in Figure 5. This clip also comprises a horizontally projecting portion 32 formed with an opening 33 through which is adapted to pass a screw 34 for holding the stop clip in a slot 35 in an extension 36 leading upwardly from the gas cock casing 8 as shown more particularly in Figure 3. Extending from the upstanding portion 31 in the opposite direction from the mounting 32 is a stop finger 37 adapted to engage with a stop (not shown) on the inside of the dial 23 whereby to preclude rotation of the dial through quite 360° in either direction. In this manner the original dial setting determined by the factory is preserved.

By rotating the dial in one direction or the other, the temperature adjusting screw 21 is correspondingly rotated thereby tending to either increase or relieve tension on the bi-metal element 18. This element at one end bears against supporting ears 38 on the housing 17, such ears constituting a fixed rocking mounting, and at the opposite end bearing against a gland pin 39 which projects into the valve casing 12 and engages the valve disk therein for moving the same in opposition to a spring (not shown) as customary in the art for effecting an opening movement thereof.

Figure 2:
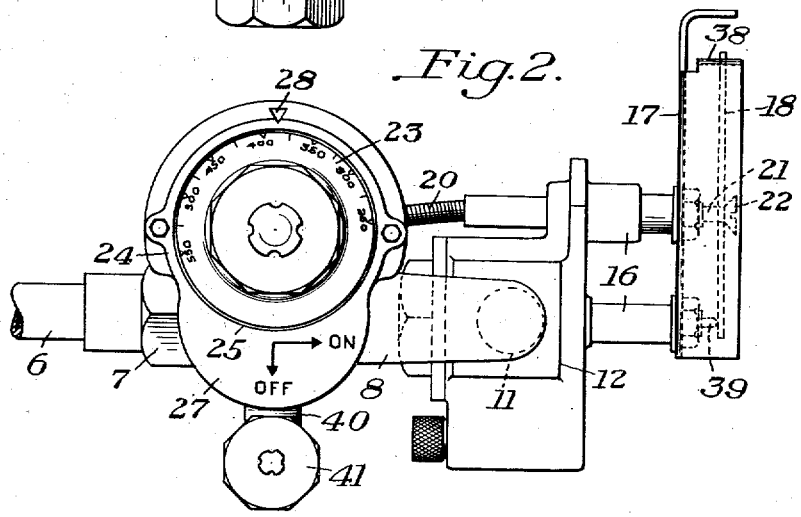
Figure 2 is a front elevational view of the structure illustrated in Figure 1.

If it be assumed that the bi-metal is of such construction that under an increasing temperature it will tend to flex to the right as viewed in Figure 2 away from the pin 39, then increased tension on the element 18 will insure holding the valve open until a higher temperature is reached in the oven 5, while by decreasing this tension by rotating the screw 21 in the opposite direction, the flow of gas will be cut off at a relatively lower temperature. The housing 17 is preferably of such construction as to be adjustable in a direction lengthwise of the element 18, and with respect to the spacing and supporting means 16, as described in my application before referred to, for the purpose of changing the effective length of the bi-metal element 18 and thereby enabling calibration to conform with actual conditions in the zone within the oven wherein the element is located and with the standard markings on the dial 23.

Secured to the front end of the gas cock within the casing 8 is a handle 40 projecting downwardly between the front panel 2 and the panel plate 24 to a sufficient extent to receive an actuating knob 41. The panel plate 24 is preferably provided with suitable indicia, as shown in Figure 2, showing the proper position of the knob 41 for either an "on" or an "off" position of the gas cock.

It will be apparent from the above description that the knob 41 for actuating the gas cock may be positioned very close to the thermostatic dial so as to make a compact appearing unit. It will also be apparent that the axis of the valve for controlling the flow of gas to the thermostatic valve casing extends in the same general direction as the axis of the thermostatic dial, and, being positioned very close together, rotation of the gas cock handle will be arcuately about the periphery of the thermostatic dial. It will also be apparent that the operations of the gas cock handle and thermostatic dial are entirely independent.

Figure 8:
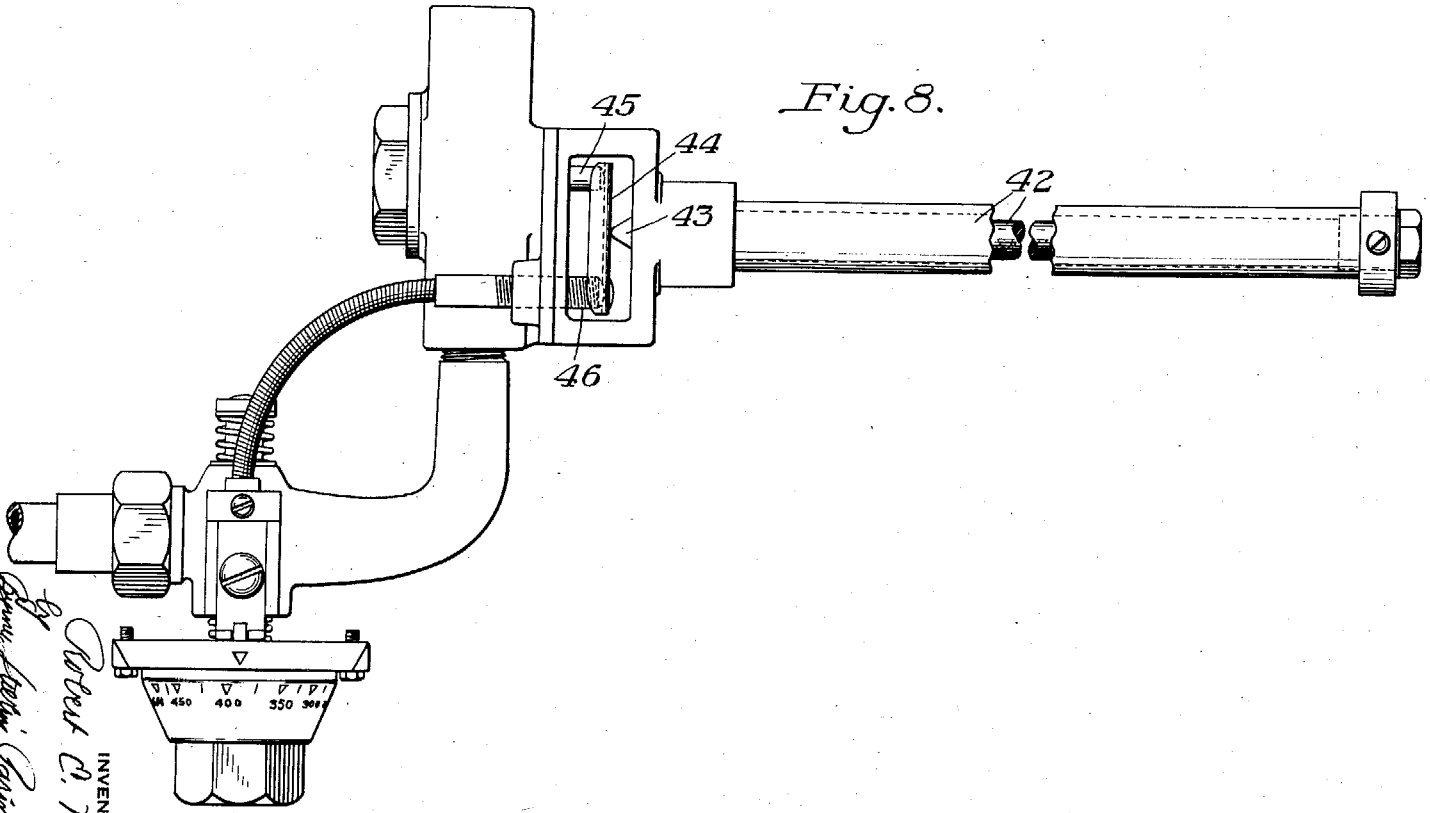
Figure 8 is a view generally similar to Figure 1, but illustrating another embodiment of my invention.

In Figure 8 of the drawings there is illustrated a construction generally similar to that shown in Figure 1, with the exception that the bi-metal element 18 is replaced by a rod and tube type thermostat 42 the pressure element 43 of which bears against a lever 44 one end of which lever engages the gland pin 45 and the opposite end of which is engaged by the adjusting screw 46. It will thus be apparent that the combination dial and gas cock construction hereinbefore described is adaptable for use either with the bimetal type of thermostatic control, or the more common rod and tube type.

By having a gas cock casing 8 for a gas cock effective for manually controlling the supply of gas to a thermostatic valve, and providing the gas cock casing with an extension or projection adapted to provide a mounting for the dial by means of which the thermostat is controlled, it is possible to provide a compact and convenient control unit possessing the advantages before referred to.

While I have herein illustrated and described certain preferred features of construction, it will be understood that changes in the construction, arrangement and location of the parts may be made without departing either from the spirit of my invention or the scope of my broader claims.

I claim:

1. In a structure of the character described, a thermostatic valve casing, a gas cock casing connected thereto for delivering gas to the thermostatic valve casing, said gas cock casing having a gas cock plug, a handle for operating said gas cock plug, a panel, and a thermostatic dial carried by said gas cock casing independently of said handle and said cock and arranged to regulate the flow of gas through said thermostatic valve casing, said dial extending through said panel and carrying indicia cooperating with indicia carried by said panel and said handle being mounted to the rear of said thermostatic dial and extending through said panel.

2. In a structure of the character described, a thermostatic valve casing, a gas cock casing connected thereto for delivering gas to the thermostatic valve casing, said gas cock casing having a gas cock plug, a handle for operating said gas cock plug, a panel carrying indicia cooperating with said handle, and a thermostatic dial carried by said gas cock casing independently of said handle and said cock and arranged to regulate the flow of gas through said thermostatic valve casing, said dial extending through said panel and carrying indicia cooperating with indicia carried by said panel.

3. In a structure of the character described, a thermostatic valve casing, a gas cock for controlling the flow of gas to the thermostatic valve casing, a handle for operating the gas cock, a plate carrying indicia cooperating with said handle, and a thermostatic dial supported by the gas cock independently of the handle and arranged to regulate the flow of gas through said thermostatic valve casing, said dial being mounted adjacent said plate and carrying indicia cooperating with indicia carried by said plate.

4. In a structure of the character described, a thermostatic valve casing, a gas cock for controlling the flow of gas to the thermostatic valve casing, a panel plate having indicia thereon, a handle for operating the gas cock and arranged to cooperate with indicia on said panel plate, and a thermostatic dial supported by the gas cock and connections for regulating the flow of gas through the thermostatic valve casing, said dial and connections extending through said panel plate and having indicia cooperating with indicia carried by said panel plate, the gas cock handle and the thermostatic dial being positioned adjacent each other and each being mounted for independent rotation about an axis extending in the same general direction as the axis of the other.

5. In a structure of the character described, a thermostatic valve casing, a gas cock for controlling the flow of gas to the thermostatic valve casing, a panel having indicia thereon, a handle for operating the gas cock, and a thermostatic dial and connections for regulating the flow of gas through said thermostatic valve casing and extending through said panel and having indicia cooperating with indicia carried by said panel, the gas cock handle being mounted to the rear of the thermostatic dial for rotation arcuately about the periphery of the thermostatic dial and independently of the rotation of the dial.

6. In a structure of the character described, a thermostatic valve casing, a gas cock for controlling the flow of gas to the thermostatic valve casing, a panel having indicia thereon, a handle for operating the gas cock, and a thermostatic dial mounted on the gas cock and extending through said panel and having indicia cooperating with indicia carried by the panel, the gas cock handle being mounted to the rear of the thermostatic dial and said handle and dial each being mounted for independent rotation about an axis extending in the same general direction as the axis of the other.

7. In a structure of the character described, a thermostatic valve casing, a gas cock for controlling the flow of gas to the thermostatic valve casing, a panel having indicia thereon, a handle for operating the gas cock, and a thermostatic dial and connections for regulating the flow of gas through the thermostatic valve mounted on the gas cock and extending through said panel and having indicia cooperating with indicia carried by said panel, the gas cock handle being mounted to the rear of and adjacent the thermostatic dial and mounted for rotation arcuately about the periphery of the thermostatic dial and independently of the rotation of the dial.

8. In a structure of the character described, a thermostatic valve casing, a gas cock for controlling the flow of gas to the thermostatic casing, a panel plate, a handle and connections for operating said gas cock extending through the panel plate, and a thermostatic dial mounted on said gas cock for operation independently of the said handle and said cock and arranged to regulate the flow of gas through said thermostatic valve casing, said dial extending through the panel plate and carrying indicia cooperating with indicia carried by said plate.

9. In a structure of the character described, a thermostatic valve casing, a gas cock casing connected thereto for delivering gas to the thermostatic valve casing, said gas cock casing having a gas cock therein, a handle for operating said gas cock, a panel plate carrying indicia cooperating with said handle, and a thermostatic dial carried by said gas cock casing independently of said handle and said cock and arranged to regulate the flow of gas through said thermostatic valve casing, said dial extending through said panel plate and carrying indicia cooperating with indicia carried by said plate.

ROBERT E. NEWELL.